United States Patent
Ip et al.

(10) Patent No.: US 11,391,622 B2
(45) Date of Patent: Jul. 19, 2022

(54) OPTICAL FIBER SENSING SYSTEM WITH REDUCED SPATIAL RESOLUTION AND NOISE FOR MULTIPLE APPLICATION USES

(71) Applicant: NEC Laboratories America, Inc., Princeton, NJ (US)

(72) Inventors: Ezra Ip, West Windsor, NJ (US); Yue-Kai Huang, Princeton, NJ (US); Junqiang Hu, Davis, CA (US); Philip Ji, Cranbury, CA (US); Shuji Murakami, Monmouth Junction, NJ (US); Yaowen Li, Princeton, NJ (US)

(73) Assignee: NEC Corporation

( * ) Notice: Subject to any disclaimer, the term of this patent is extended or adjusted under 35 U.S.C. 154(b) by 13 days.

(21) Appl. No.: 16/783,119

(22) Filed: Feb. 5, 2020

(65) Prior Publication Data

US 2020/0249076 A1     Aug. 6, 2020

Related U.S. Application Data

(60) Provisional application No. 62/923,682, filed on Oct. 21, 2019, provisional application No. 62/923,680, filed on Oct. 21, 2019, provisional application No. 62/801,681, filed on Feb. 6, 2019.

(51) Int. Cl.
    *G01H 9/00*     (2006.01)

(52) U.S. Cl.
    CPC .................... *G01H 9/004* (2013.01)

(58) Field of Classification Search
None
See application file for complete search history.

(56) References Cited

U.S. PATENT DOCUMENTS

| | | | |
|---|---|---|---|
| 2013/0038879 A1* | 2/2013 | Dorize | G01M 11/3127 356/445 |
| 2015/0270895 A1* | 9/2015 | Fink | H04J 14/0227 398/16 |
| 2016/0191163 A1* | 6/2016 | Preston | H04B 10/2575 398/16 |
| 2016/0202142 A1* | 7/2016 | Wang | G02B 6/14 356/73.1 |
| 2019/0006758 A1* | 1/2019 | Buskgaard | G08B 13/08 |

\* cited by examiner

*Primary Examiner* — Lisa M Caputo
*Assistant Examiner* — Nigel H Plumb
(74) *Attorney, Agent, or Firm* — Joseph Kolodka

(57) ABSTRACT

An optical fiber sensing system with reduced spatial resolution and noise for multiple applications and method of operating same that employs a coherent receiver configured to detect and digitize both I and Q signals in two polarizations and performs signal beating in a digital signal processor (DSP) using the polarization-diverse signals to obtain beating results for multiple polarization state pairs that effectively reduces polarization induced fading effect(s) while providing faster sensing speed(s) and more efficient filtering. Since Rayleigh signals are captured in two orthogonal polarizations, four beating products are determined at once in the DSP and all are used for fiber strain determination thereby avoiding polarization fading.

4 Claims, 22 Drawing Sheets

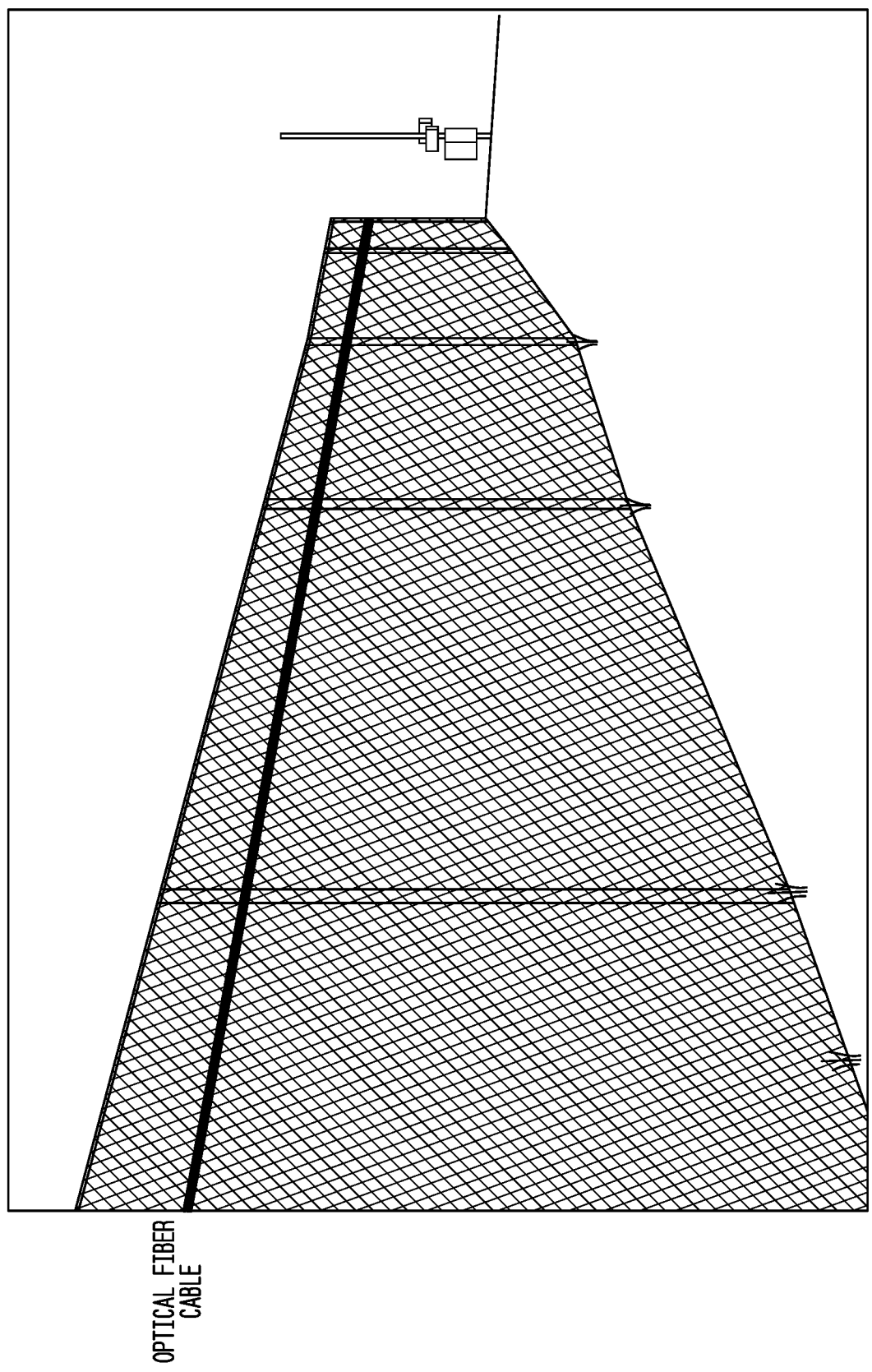

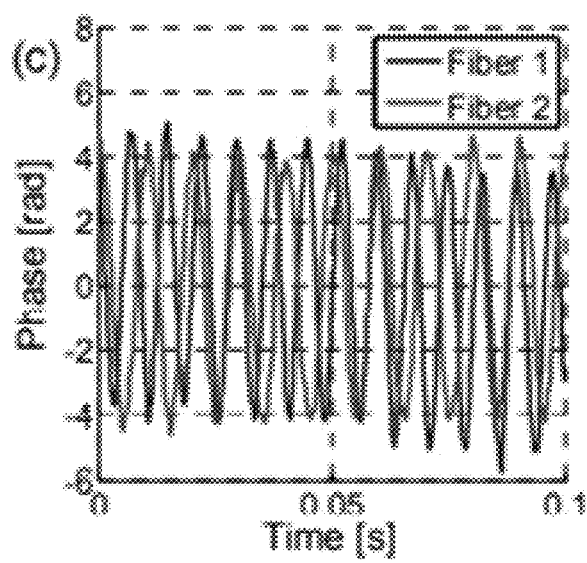 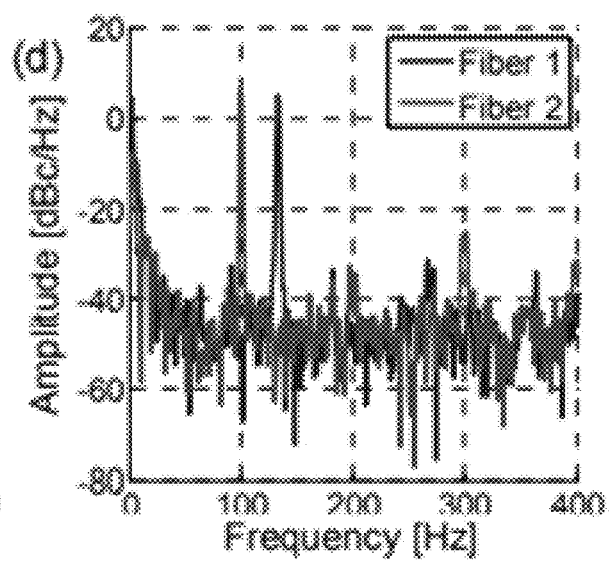
*FIG. 11(C)*  *FIG. 11(D)*

OPTICAL FIBER SENSING SYSTEM WITH REDUCED SPATIAL RESOLUTION AND NOISE FOR MULTIPLE APPLICATION USES

CROSS REFERENCE

This disclosure claims the benefit of U.S. Provisional Patent Application Ser. No. 62/801,681 filed Feb. 6, 2019, U.S. Provisional Patent Application Ser. No. 62/923,680 filed Oct. 21, 2019, and U.S. Provisional Patent Application Ser. No. 62/923,682 filed Oct. 21, 2019, the entire contents of each are incorporated by reference as if set forth at length herein.

TECHNICAL FIELD

This disclosure relates generally to optical communications and optical sensing systems, methods and structures. More particularly, it describes distributed optical fiber sensing systems, methods, and structures and application thereof.

BACKGROUND

As is known in the optical sensing and communications arts, distributed optical fiber sensing involves several related technologies in which an interrogator—generally located within a station—actively generates optical signals, introduces them into an optical fiber, and subsequently detects reflected signals originating along a length of the fiber. Such reflections may originate—for example—as a result of changing environmental conditions that the fiber and/or sensors positioned along its length experience. As such, the optical fiber conveys—via reflected signal(s)—environmental/sensory data back to the interrogator where—using signal processing techniques—the interrogator determines/derives valuable information about environmental conditions along the length of the fiber.

As currently implemented, distributed optical fiber sensing (DOFS or DFS) finds widespread applicability in such diverse applications as infrastructure monitoring, intrusion detection, and environmental monitoring—including earthquake detection. Given this application importance, improved optical fiber sensing systems, methods, and structures would represent a welcome addition to the art.

SUMMARY

An advance in the art is made according to aspects of the present disclosure directed to improved optical fiber sensing systems, methods, and structures employing coherent detection of backscattered signals.

In sharp contrast to the prior art, systems, methods, and structures according to aspects of the present disclosure advantageously employ a coherent detector that employs a polarization diversity coherent receiver configured to detect and digitize both I and Q signal in two polarizations.

Instead of performing differential beating optically to determine dynamic fiber strain, the signal beating is done in a DSP using the polarization-diverse signals. This advantageously allows systems, methods and structures according to the present disclosure to obtain beating results for multiple polarization state pairs, thus effectively reducing polarization induced fading effect.

As Compared to using polarization switching as taught and disclosed in the prior art, systems methods and structures employing coherent-based multi-polarization DSP processing according to the present disclosure provide faster sensing speed and more efficient filtering.

In an illustrative configuration according to an aspect of the present disclosure, a photo-detector detects the product of an amplified Rayleigh reflected signal and local oscillator (LO). In this inventive manner, an ASE signal produced by the optical amplifier will not be enhanced and fall to the signal band as in direct-detection. The SNR of the electrical photo-detected signal will be the same as the optical SNR before photo-detection. Therefore, the out-of-band ASE noise can be effectively removed by electrical filter and digital filter after digitization. This advantageously provides higher SNR and better performance for DAS designs in long distance or high spatial resolution application(s).

BRIEF DESCRIPTION OF THE DRAWING

A more complete understanding of the present disclosure may be realized by reference to the accompanying drawing in which:

FIG. 7(A) is a photo illustration of a DOFS system mounted on a fence.

FIG. 11(C) is a plot of phase evolution; FIG. 11(D) is a plot of its spectrum measured on fibers #1 and #2.

Figure 1:
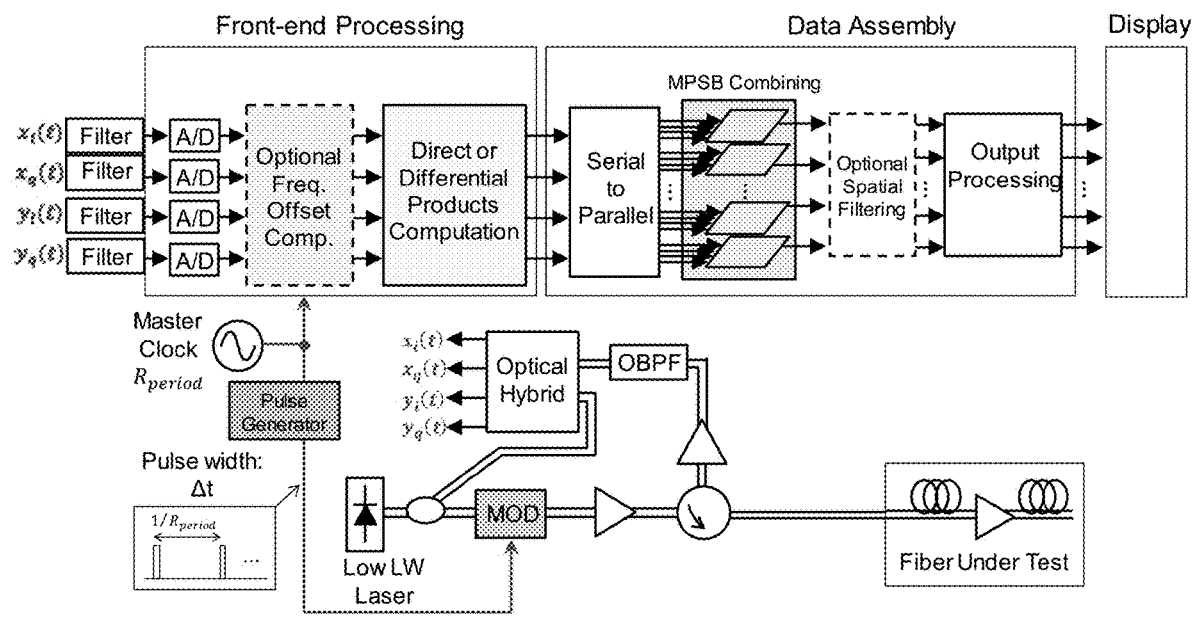
FIG. 1 shows a schematic diagram of an illustrative system architecture configuration of a distributed fiber sensing arrangement employing coherent detection according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting once more that distributed fiber sensing generally describes systems and methods that include an interrogator system—conveniently and/or centrally located inside a station—which actively generates optical signals, introduces those signals into an optical fiber, and subsequently detects reflected signals that originate along the fiber. Operationally, such fiber acts as a passive link that passes or otherwise conveys environmental information back to the interrogator via the reflected signal(s). By processing the reflected/received signal(s), the interrogator derives information about the environmental conditions along the entire fiber.

Advantageously, distributed fiber sensing (DFS) systems may be deployed in wide range of applications such as infrastructure monitoring, intrusion detection, and environmental monitoring including earthquake detection. For distributed acoustic sensing (DAS) and distributed vibration sensing (DVS), backward Rayleigh scattering effects are employed to detect changes in fiber strain, while the fiber itself acts as the transmission medium for relaying optical sensing signal(s) back to the interrogator. The obtained dynamic strain signal will be used to detect vibration and acoustic signal along the fiber with its location information.

Since Rayleigh scattering is a random effect and susceptible to signal fading, both DAS and DVS experience strong polarization fading in a conventional direct detection scheme. More particularly, detection of dynamic fiber strain requires signal beating of the returned optical signal. The returned light signal from the fiber are typically randomly polarized, thus the signal beating products can fade if the polarization orientations are not aligned. This will cause instability or create "blind spots" in the sensing measurement.

Yet another important factor in DAS and DVS system design is the sensing distance of the interrogator (i.e., the distance of the interrogator to/from the sensory action). The backward Rayleigh scattered signals are typically much weaker compared to typical communication signal, and they will generally experience double the fiber loss because of the round-trip travel in the fiber propagation. Optical amplification schemes, such as EDFA or Raman amplifications, can amplify the sensing signals with added optical ASE noise, which is wide band compared to the sensing signal. Direct-detection of the optical signal requires removal of the ASE noise via optical filters. Notwithstanding, the pass-band of the optical filters are typically 10~100× wider than the signal band so the ASE noise cannot be removed effectively. As such, the performance of such a system will deteriorate quickly as the interrogator distance grows or if multiple amplifiers are used in the sensing system.

In direct-detection-based DAS and DVS systems, polarization fading effects could be mitigated by reducing the polarization sensitive nature of the sensing system. Accordingly, one prior art approach employed interrogation pulses with orthogonal polarizations applied in a DVS (phase-sensitive OTDR) system at different frame(s), and the measurement results of orthogonal pulses were averaged to produce the final sensing data. In another approach, a dual-pulse interrogation method using pre-assigned polarization states were applied in the same frame to obtain beating signals reflected by optical FBGs. Of course, the same method can be applied to DAS without FBG, however 4 frames are needed to get all the beating results for pairs of polarization states. In these implementations, not only additional polarization switching components are needed for additional cost, the overall sensing speed will be reduced because multiple frames are needed to obtain one polarization-insensitive trace.

Another drawback in direct-detection DAS/DVS system is that out-of-band ASE noise cannot be filtered cleanly by optical filters before photo-detection. The remaining wide-band ASE noise, after square-law photo detection, will fall back to near the baseband and interfere with the sensing signal. A scheme called phase-generated carrier, which applies phase modulation to one local beating optical path, shifts the beating signal to an offset frequency for I/Q phase detection. The method also shifts the signal away from the DC where the ASE beat noise effect is the highest. However, a photo-detected signal still exhibits a much higher noise floor compared to the original optical signal due to insufficient filtering.

Given these and other problems associated with such sensor systems, we present a coherent detection based DAS configuration which cures these and other noted problems. In our coherent detection based DAS platform according to aspects of the present disclosure, a polarization diversity coherent receiver is employed to detect and digitize I and Q signal in two polarizations. Instead of performing differential beating optically to determine dynamic fiber strain, the signal beating is done in a DSP using the polarization-diverse signals. This allows us to obtain beating results for multiple polarization state pairs, thus effectively reducing polarization induced fading effect.

Compared to using polarization switching in the prior arts, our coherent-based multi-polarization DSP processing allows faster sensing speed because only one interrogation frame is required. Due to the advance of coherent detection technology in fiber communication, the cost of a commercial integrated coherent receiver (ICR) is comparable to direction-detection based DAS receiver. Without the need to use polarization switching component, our coherent-based system according to aspects of the present disclosure will provide significant cost advantage(s) as well.

Advantageously, employing coherent detection also allows us to perform filtering more efficiently. A photo-detector detects a product of an amplified Rayleigh reflected signal and the Local Oscillator (LO). This way, the ASE signal produced by the optical amplifier will not be enhanced and fall to the signal band as in direct-detection. The SNR of the electrical photo-detected signal will be the same as the optical SNR before photo-detection. Therefore, the out-of-band ASE noise can be effectively removed by electrical filter and digital filter after digitization. This advantageously and surprisingly provides higher SNR and better performance for DAS configurations according to aspects of the present disclosure—particularly in long distance or high spatial resolution application.

FIG. 1 shows a schematic diagram of an illustrative system architecture configuration of a distributed fiber sensing arrangement employing coherent detection according to aspects of the present disclosure. With reference to that figure, it may be noted that optical interrogating pulses having pulse width(s) of $\Delta t$ and repetition rate(s) of $R_{period}$ are generated by an optical modulator with high extinction ratio, which advantageously comprise an acoustic-optical modulator (AOM) or semiconductor optical amplifier (SOA). After amplification, the pulses are directed into the fiber under test (FUT). Rayleigh reflected signal(s) received from the FUT are directed to a coherent receiver via an optical circulator. After optical preamp and optical band pass filtering (OBPF), it (signal(s)) is/are directed to an optical hybrid for coherent detection.

Operationally, a narrow linewidth (1~10 kHz) laser may be used in both pulse generation and homodyne detection, thereby minimizing intrinsic phase noise generated by the LO laser. A commercially available optical hybrid, mixes the LO with the signal in two orthogonal polarizations and orthogonal phases (0 and 90 degrees), producing a total of four mixed signal for photo-detection ($x_i(t)$, $x_q(t)$, $y_i(t)$, and $y_q(t)$). The photo-detectors and optical hybrids are often integrated together in coherent communication systems know as an Integrated Coherent Receiver (ICR).

One advantage of our coherent-detection DAS platform is the ASE noise removal capability. Typical optical filtering can only provide as narrow as ~10-GHz of pass-band bandwidth. The DAS/DVS system signal bandwidth is proportional to the inverse of the pulse width, which is typically in the order of 10~100-MHz. With only optical filtering, the out-of-band ASE noise generated by optical amplification cannot be completely removed. In direct detection, the unfiltered noise will fall into the signal band after square-law photo-detection, deteriorating the SNR of the detected signal. In coherent detection according to aspects of the present disclosure however, the unfiltered ASE noise stays out-of-band after photo-detection, and it can then be removed either by electrical filters before digitization, or by digital filters in the DSP after digitization using four ADCs.

Figure 2:
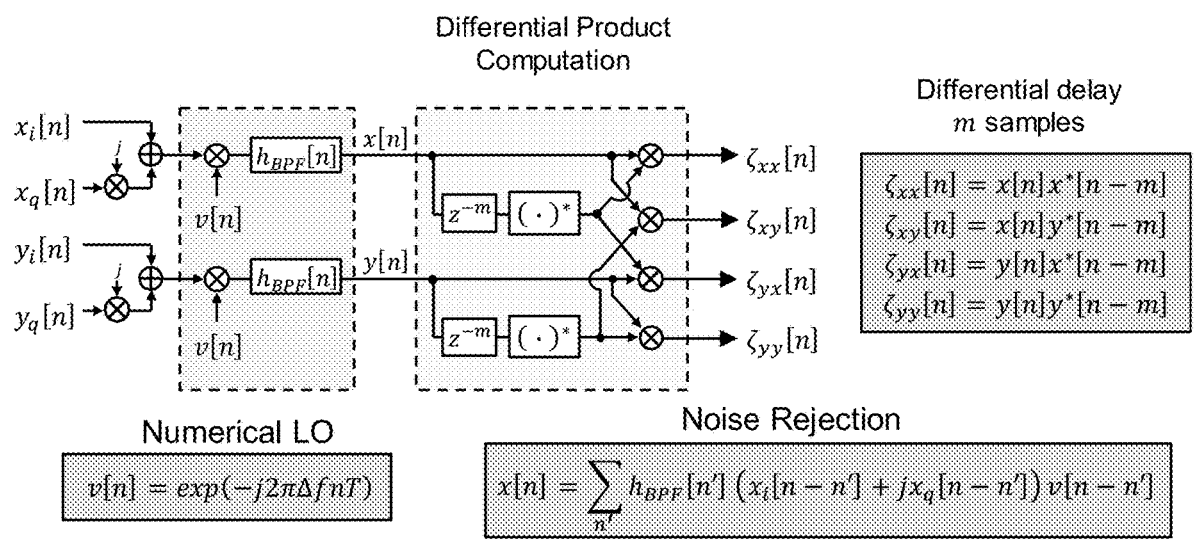
FIG. 2 shows a schematic diagram of an illustrative front-end digital signal processing (DSP) for coherent-detection based distributed fiber sensing according to aspects of the present disclosure.

The four digitized signal lanes are then combined to two complex-valued lanes for x and y polarizations. Optional frequency offset compensation is applied to remove the frequency offset created during the pulse modulation, if it is created by an AOM. A digital band pass filter, hBPF[n], can be used to remove any residual out-of-band ASE noise left by the optical and electrical filter. Its coefficient can be optimized depending on the pulse width used for interrogation. FIG. 2 shows a schematic diagram of an illustrative front-end digital signal processing (DSP) for coherent-detection based distributed fiber sensing according to aspects of the present disclosure.

Figure 3:
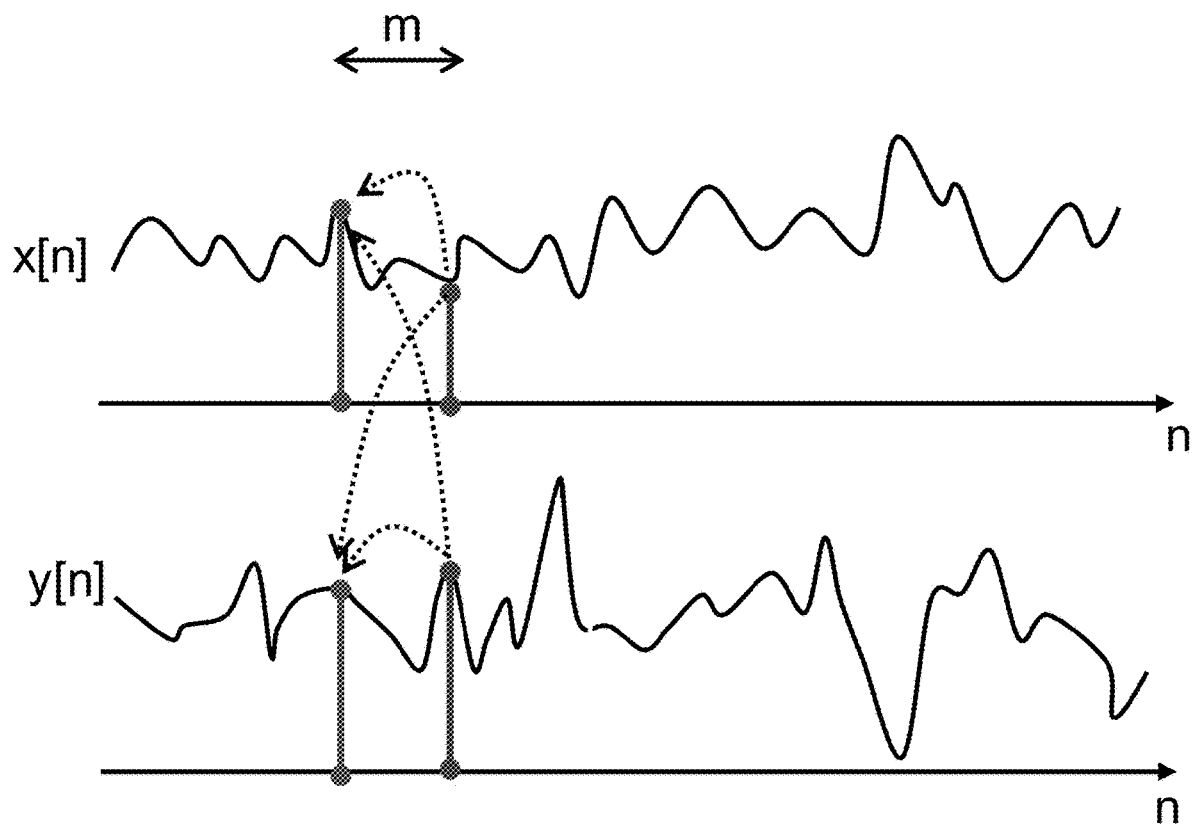
FIG. 3 shows a pair of plots illustrating computation of four differential beat product terms from complex-valued x[n] and y[n] according to aspects of the present disclosure.

Next, the dynamic fiber strain will be calculated using the beat products between complex-valued Rayleigh reflected signals at two separate locations FIG. 3 shows a pair of plots illustrating computation of four differential beat product terms from complex-valued x[n] and y[n] according to aspects of the present disclosure.

As shown in FIG. 3, the beat products between two complex value samples, separated by m samples, will be used to determine the accumulated strain along the fiber section. In conventional direct-detection DAS, the differential beating was obtained using a physical interferometer. The method is susceptible to polarization fading, which occurs if the Rayleigh signals at the two locations are not aligned. In our coherent DAS platform, because we can capture the Rayleigh signals in two orthogonal polarizations, we can compute all four of the beating products $\zeta_{xx}$, $\zeta_{yy}$, $\zeta_{xy}$, $\zeta_{yx}$ at once in DSP, and use all of them for fiber strain computation and avoid polarization fading. Another benefit of using the coherent DAS platform is that the gauge sample length m can be tuned dynamically in the DSP, thus the sensitivity and spatial resolution of the strain measurement can be adjusted according to the application requirements.

Figure 4:
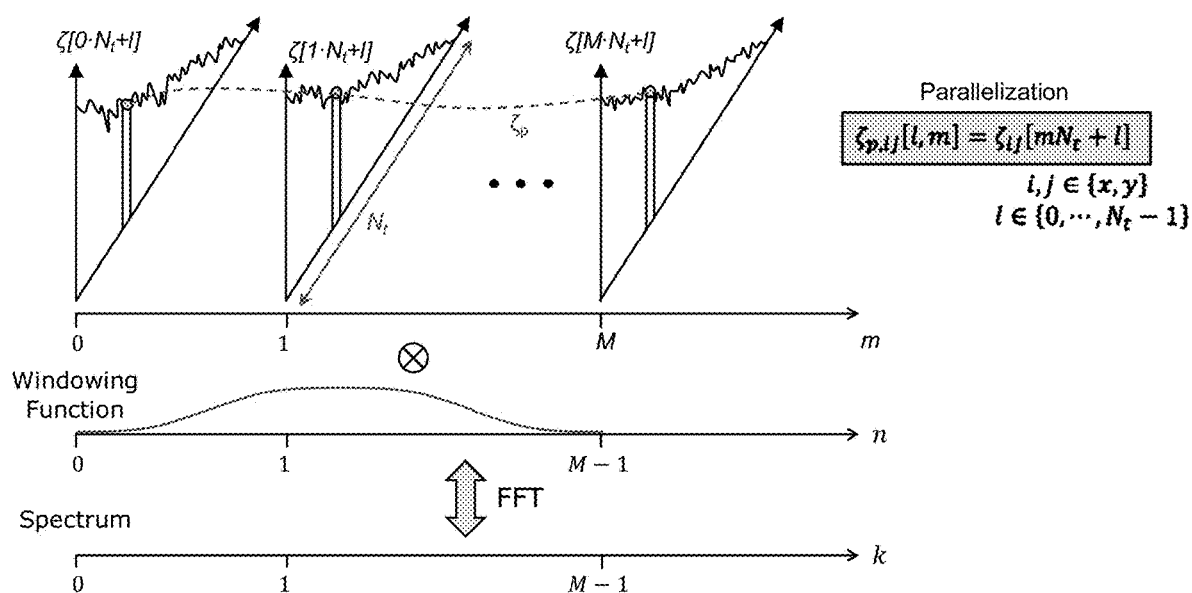
FIG. 4 shows graphically the process of converting beat-product signal from serial to parallel with respect to location according to aspects of the present disclosure.

After obtaining the four beat-product terms $\zeta_{xx}$, $\zeta_{yy}$, $\zeta_{xy}$, $\zeta_{yx}$ for every frame, our algorithm will convert the each of the beat signals from serial sequence of locations—as it was received in each interrogation frame, to parallel location sequences, as shown in FIG. 4.—which shows graphically the process of converting beat-product signal from serial to parallel with respect to location according to aspects of the present disclosure. The output of the process will arrange data traces into beat product vectors of $\zeta_{p,ij}$. The sampling rate of the output trace will be the repetition rate of the interrogation, or known as the frame rates.

Figure 5:
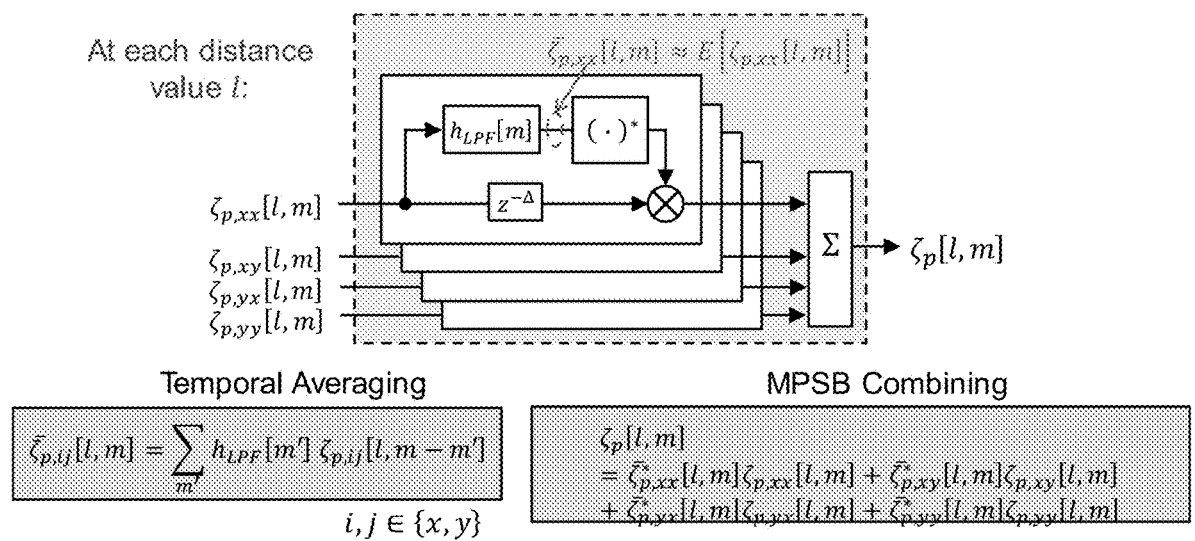
FIG. 5 shows the process of multi-polarization-state combining according to aspects of the present disclosure.

The parallelized beat-product vectors are then processed at each different location separately to calculate the dynamic fiber strain. The process, called the multi-polarization-state combining, is the key in mitigating the polarization fading in DAS systems by properly weighting and combining the four beat product results $\zeta_{p,ij}$ to just one $\zeta_p$ as shown in FIG. 5—which shows the process of multi-polarization-state combining according to aspects of the present disclosure.

First a temporal averaging step is done, using a low pass filter $h_{LPF}[m]$, to find the average of each four vectors. Then the complex conjugate of the averaged vector is multiplied with the corresponding vector using inner product before all four products are summed. The inner product multiplication does two function: it first provides weighting on each of the four vector so that the one that has the larger beating values (less faded) will contribute more to the final results; secondly it rotates all four vectors so they all point to the same direction thus they can be added without signal cancellation. After this step, only one complex valued vector $\zeta_p$ will represent the fiber strain signal at location p.

After MPSB process, one can decide whether to keep the highest spatial resolution or do additional spatial averaging to reduce the spatial resolution. At the output process, one can decide what can be displayed for the DAS system. One can either choose to do processing on the complex valued vectors or take the phase of the complex vector. One can plot a colored 2D map the power dynamic strain power versus distance and time, which will result in a so called "water-fall plot." A spectrogram can be obtained by plotting the spectral power after FFT versus distance and frequency. Or one can just plot directly the temporal or frequency trace at the location of interest for display.

One additional feature of a coherent DAS platform according to aspects of the present disclosure is that it can also be modified to function as a DVS or phase-sensitive OTDR. Instead of calculating the differential beat products, one can calculate the combined power of x[n] and y[n] in FIG. 2. The obtained signal will be the same in physical meaning as the photo-detected signal in a direct detection DVS, however the coherent detection platform allows additional signal filtering to be done with much higher SNR. This feature will be useful in applications where DSP resource is limited but high SNR is required for vibration detection Application—Environmental Monitoring FIG. 6 shows a schematic diagram of an illustrative arrangement of a bidirectional dual-usage fiber architecture, where communications and sensing applications coexist on different wavelengths and sensing pulses and communications channels propagate in different directions in the optical fiber to mitigate nonlinear interaction according to aspects of the present disclosure.

Bidirectional Dual-Usage Fiber Architecture.

Figure 6:
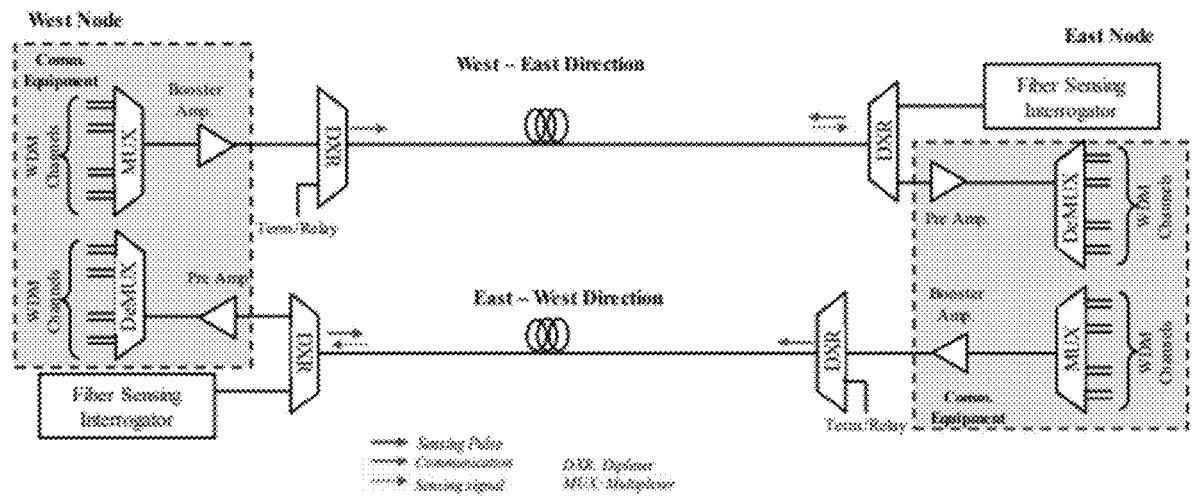
FIG. 6 shows a schematic diagram of an illustrative arrangement of a bidirectional dual-usage fiber architecture, where communications and sensing applications coexist on different wavelengths and sensing pulses and communications channels propagate in different directions in the optical fiber to mitigate nonlinear interaction according to aspects of the present disclosure.
Figure 6:
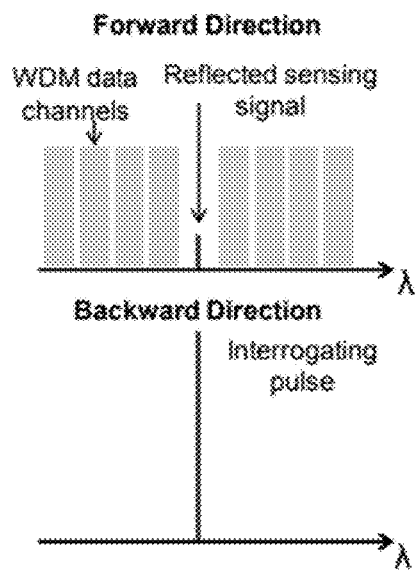

FIG. 6 shows an architecture according to aspects of the present disclosure of a bidirectional dual-usage system where data communication channels and DFOS coexist on the same optical fiber. The system includes a fiber-pair supporting two-way communications between two nodes, which can be located in data centers or at add-drop/repeater sites.

As may be observed, the communications channels and sensing pulses travel in opposite directions in each fiber to reduce their mutual nonlinear interference, allowing both systems to operate in the C-band with low loss. As configured, diplexers are employed to multiplex/demultiplex communication and sensing signals. This advantageously prevents out-of-band amplified spontaneous emission (ASE) noise from the booster amplifiers from swamping the weak Rayleigh back-reflection of the DFOS system, which co-propagates with the communication channels at substantially lower power, as shown in the figure (lower). Normally, only one fiber sensing interrogator is needed per cable. It is possible to place a second DFOS system on the return fiber as shown in the figure—as a backup system—or as a different DFOS system to a different environmental parameter—for example, temperature.

Optical Fiber Sensor Applications—Intrusion Detection.

Figure 7B:
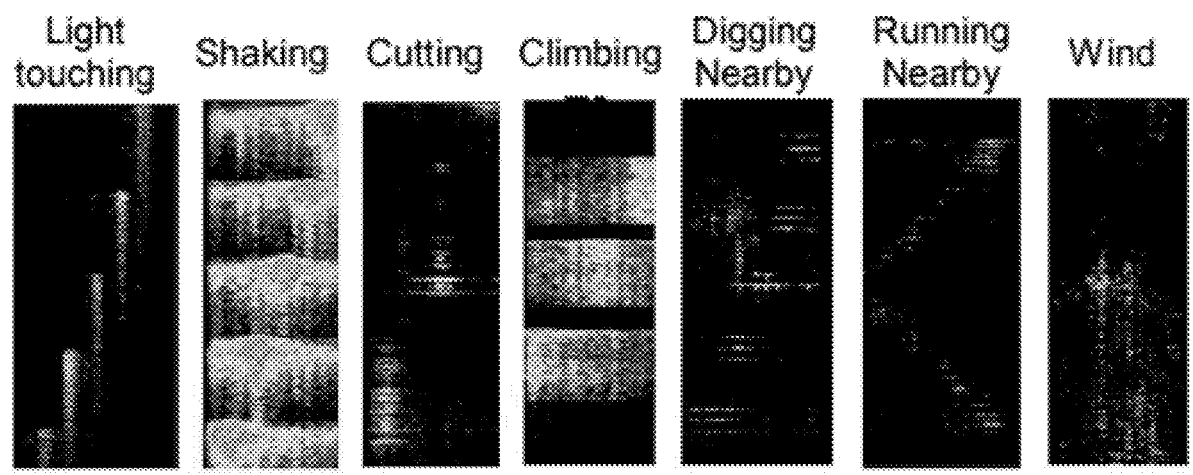
FIG. 7(B) shows a series of "Waterfall" plots recorded for different vibration events which may be classified by machine learning according to aspects of the present disclosure.

FIG. 7(A) is a photo illustration of a DOFS system mounted on a fence; FIG. 7(B) shows a series of "Waterfall" plots recorded for different vibration events which may be classified by machine learning according to aspects of the present disclosure.

One important application of optical fiber sensors is detection of unauthorized intrusion at important facilities. By laying an optical fiber cable on the perimeter fence (FIG. 7(A)), it is possible to detect vibration over a wide-area at low cost compared with conventional deployment of security cameras. The key challenge in intrusion detection is suppressing false alarms caused by perturbations of the natural environment (wind, rain etc.) as well as movements of small animals. This is where optical fiber sensors can leverage the power artificial intelligence (AI) to classify different events.

FIG. 7(B) shows an example of different vibration patterns seen on the "waterfall plot" measured by an experimental Rayleigh-based distributed vibration sensor (DVS). The optical fiber sensor generates raw data, which is then fed to the AI for training and for event classification.

Optical Fiber Sensor Application—Road Traffic Monitoring.

A second application for optical fiber sensor arrangements according to aspects of the present disclosure is the monitoring of vehicular traffic. This is particularly attractive and feasible as many optical fiber cables are deployed near major arterial roads. Vehicular traffic creates vibration which changes position with time.

Figure 8A:
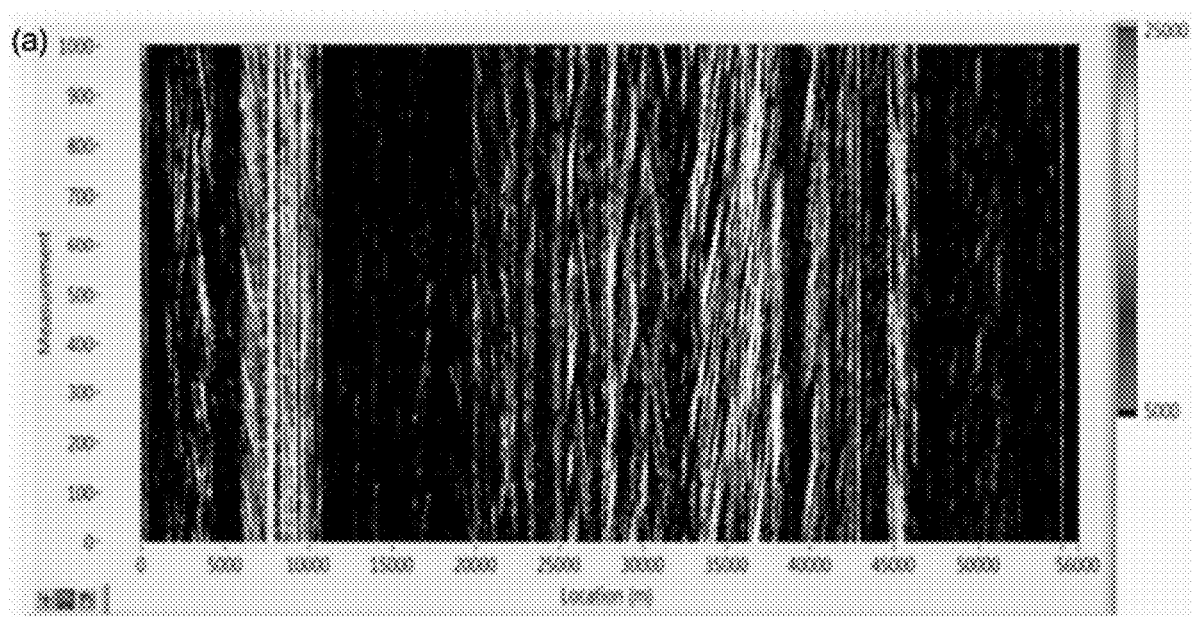
FIG. 8(A) is a waterfall plot showing vehicular traffic pattern.
Figure 8B:
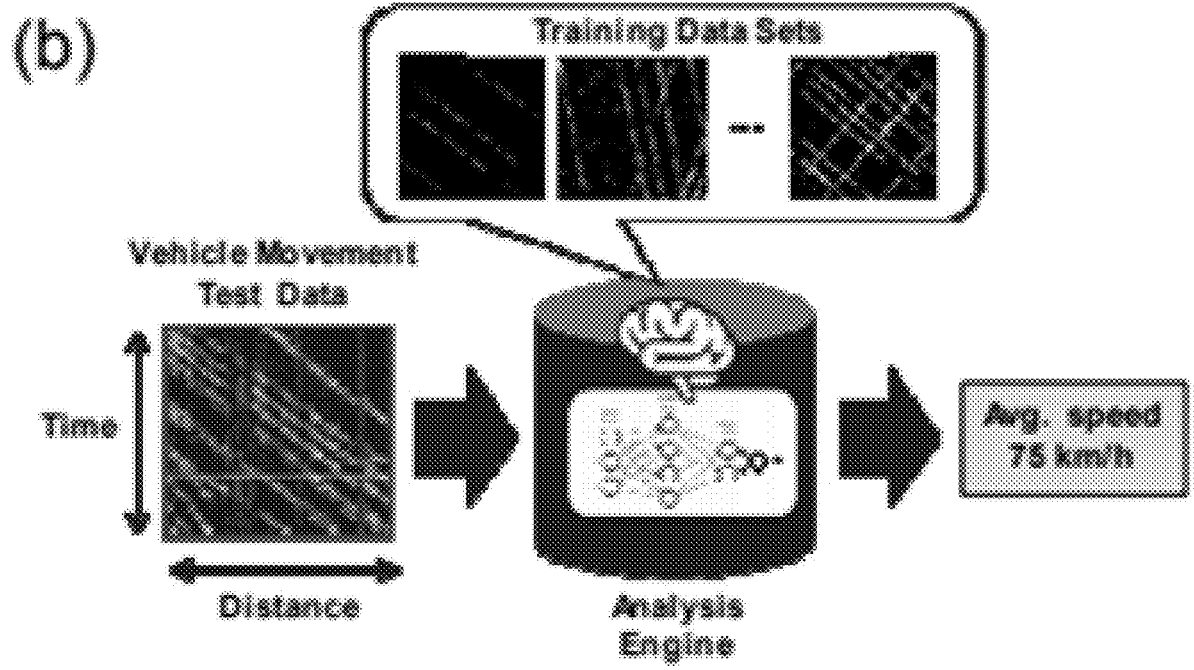
FIG. 8(B) shows an illustrative machine learning flow to determine vehicular direction and average speed.

FIG. 8(A) is a waterfall plot showing vehicular traffic pattern; FIG. 8(B) shows an illustrative machine learning flow to determine vehicular direction and average speed; and FIG. 8(C) shows a pair of constellation diagrams of PS-144QAM channels counter-propagating against the DOFS system; all according to aspects of the present disclosure.

The FIG. 8(A) waterfall plot was recorded using Rayleigh-based DVS on a 55-km fiber cable in a metropolitan area. The horizontal and vertical axes denote fiber position and time, respectively. The speed of a vehicle can thus be inferred from the slope of the vibration features: a steeper slope denotes slower traffic (congestion), while a shallow slope denotes faster traffic (smooth flow). Positive and negative slopes denote different directions of travel. As with intrusion detection, "waterfall plots" like those shown can be used as training data for the AI, which can then monitor average vehicle speed with high degree of accuracy as illustrated in FIG. 8(B).

In this experimental field trial, the DFOS application coexisted with full C-band 38-Tb/s transmission of dense WDM (DWDM) traffic where each of the 92×48-Gbaud channels carried PS144QAM at net data rate>400-Gb/s and average spectral efficiency (SE) of 8.3 b//Hz. To allow simultaneous DOFS, we reserve a spectral hole of three 50-GHz channels in FIG. 7.

Figure 8C:
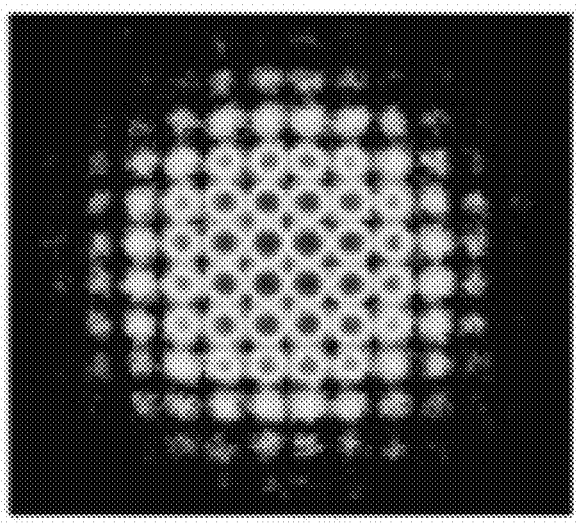
FIG. 8(C) shows a pair of constellation diagrams of PS-144QAM channels counter-propagating against the DOFS system; all according to aspects of the present disclosure.
Figure 8C:
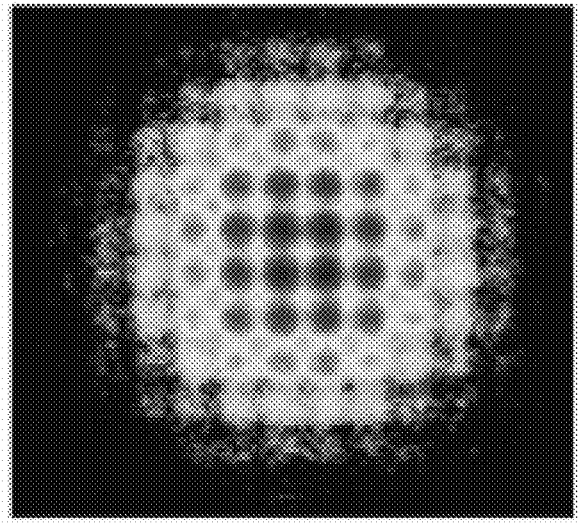

FIG. 8(C) shows the constellation diagrams of one of the PS-144 QAM in back-to-back configuration and after 110-km propagation (two 55-km spans concatenated, with the bidirectional architecture implemented on one of the spans). The launch power of the sensing pulse was adjusted for optimum operation of both communication and DOFS systems. The presence of the sensing pulse did not produce any perceptible difference in signal quality of the transmission channels. Error free operation (pre-FEC BER<2.2×10-2) was achieved, demonstrating the feasibility of the scheme.

Optical Fiber Sensor Application—Infrastructure Health Monitoring.

A third application of systems according to aspects of the present disclosure is monitoring the health of key infrastructure such as bridges. The natural frequencies of the structure, as well as the damping characteristics associated with each frequency, changes with physical deterioration. It is therefore possible to use DOFS for real-time monitoring of these changes in vibration characteristics. Training data sets for different states of deterioration of the reference structure are first generated with the help of human inspection. Once the AI is trained on the raw data, it is possible to monitoring large numbers of similar structures at low cost when they are traversed by a single optical cable.

Figure 9A:
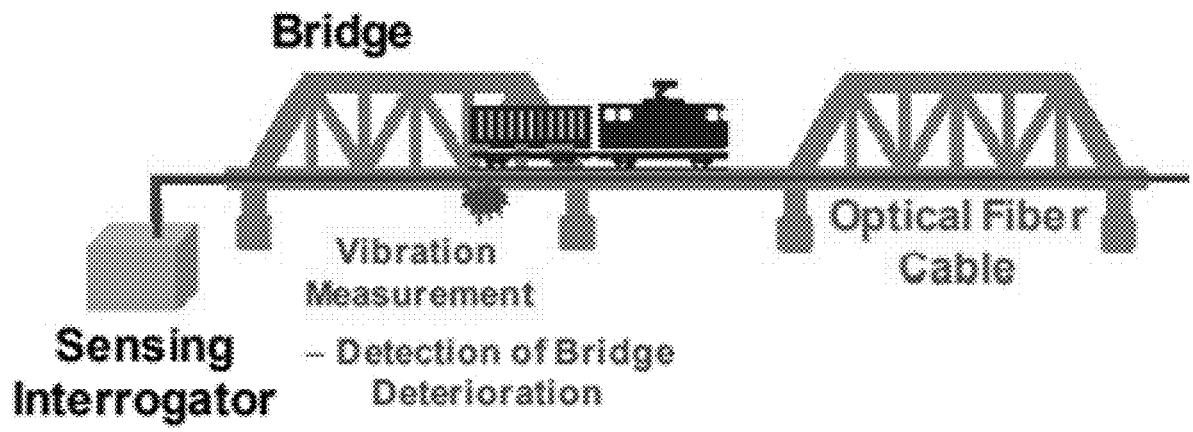
FIG. 9(A) is a schematic of an illustrative application of DOFS that monitors bridge structural health.
Figure 9B:
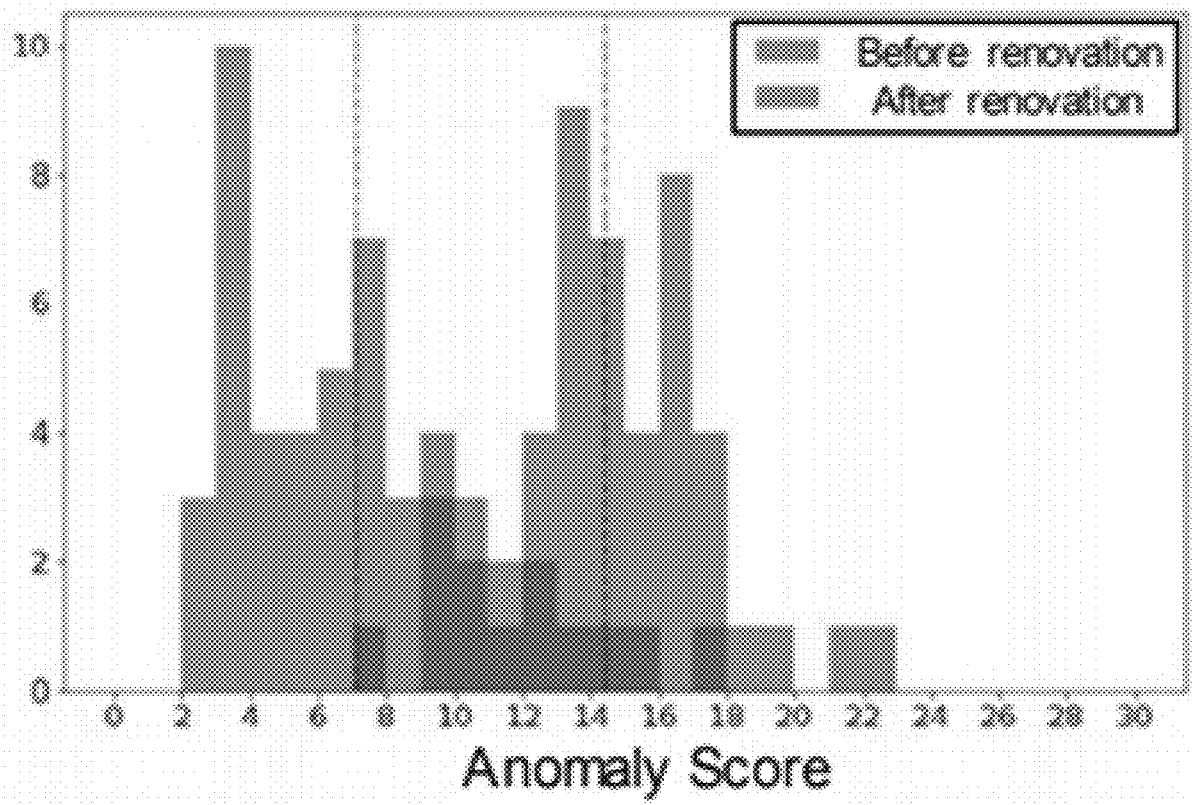
FIG. 9(B) shows a bar graph of AI classification of bridge health showing distribution of an "Anomaly score" before and after renovation; according to aspects of the present disclosure.

FIG. 9(A) is a schematic of an illustrative application of DOFS that monitors bridge structural health; FIG. 9(B) shows a bar graph of AI classification of bridge health showing distribution of an "Anomaly score" before and after renovation; according to aspects of the present disclosure. FIG. 9(B) shows field data recorded for a railway bridge in Japan. A clear difference is observed for the distribution of "anomaly score" before and after repairs, allowing 1—class classification of structural health using RAPID machine learning.

Application—Optical Fiber Sensing and Mobile Front Hall Over PON.

As will be readily appreciated and understood by those skilled in the art, Centralized Radio Access Network (C-RAN) architecture will play a key role in providing 5G mobile front-haul communication. Using passive optical networks (PONs), connections can be made from a cluster of remote radio heads (RRHs) to a centralized baseband units (BBUs) without deploy large amounts of backhaul fibers and is therefore a preferred choice. When deployed, C-RAN will be distributed every few miles in cities and suburbs to provide coverage in populated areas. For telecom operators, it is in their interest to have network infrastructure monitoring capability to protect their investment, as well as to seek additional value by collecting ambient environmental data from the densely distributed network. Distributed fiber-optic sensing (DFOS) systems can be used for a wide range of application such as infrastructure health monitoring, traffic identification, and earthquake detection.

As noted previously, in distributed acoustic sensing (DAS), an optical pulse train is launched into the fiber, and Rayleigh backscatter is used to measure dynamic changes in the fiber strain. Compared with telecommunication, the roundtrip nature of backscattering makes DAS more sensitive to signal attenuation along the cable, as losses are doubled in dB. This makes DAS over PON difficult, as PONs typically use passive splitters with split ratios of 1×32 or 1×64 to distribute signals from a feeder cable to distribution cables which provide "last mile" connections to customers spread over a wide geographic area. The round trip loss of the 1×32 splitter alone is ~30 dB, so the roundtrip loss between the optical line terminal (OLT) and the end-user's optical network unit (ONU) is typically ~40 dB, making it challenging to implement DFOS systems. As it is cost prohibitive to place DOFS interrogators at every ONU, pulse signal coding was initially explored to boost signal-to-noise ratio (SNR) and to overcome the PON splitting loss to allow interrogation from the OLT. However, this approach is unable to discriminate the individual distribution fibers after the passive splitter. In another approach, a DOFS based on Brillouin backscatter allowed discrimination of individual distribution fibers by using different fibers for each path, each with a different Brillouin frequency shift. Implementing such a scheme is very costly, however, and is incompatible with existing PON which have already been deployed.

With this in mind, we show that it is possible to make PONs compatible with DFOS according to aspects of the present disclosure by adding low-cost reflective semiconductor optical amplifiers (RSOAs) at ONUs. We advantageously employ using a time-domain multiplexed (TDM) scheme where an external control turns on/off the RSOAs at each ONU to allow DOFS on each individual distribution fiber. As we shall show and describe, our experimental results show we were able to overcome the roundtrip loss of a 1×32 splitter, as we successfully conducted DAS at a resolution of 1 m when we placed two pizeroelectric vibration sources on different distribution fibers and simultaneously measured then without any interference. We were also able to use the same system to detect vibrations from pedestrian and vehicular traffic for a buried cable next to a roadway. The DAS system coexisted with a two-way PAM4-based 10-Gb/s communication link which can be used for front-haul access.

Hybrid Data Transmission/Sensing PON Architecture.

Figure 10A:
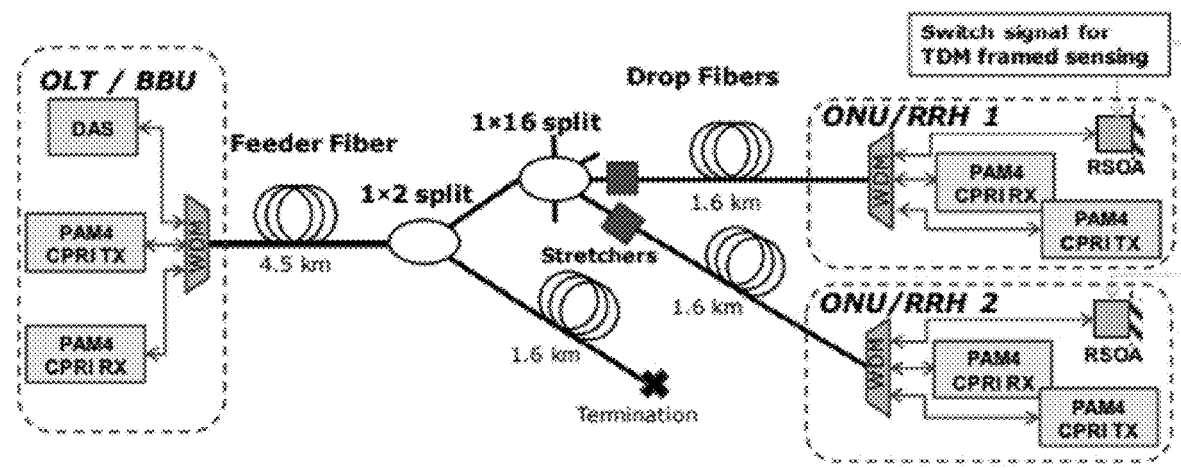
FIG. 10(A) is a schematic of an illustrative experimental setup for DOFS-compatible PON wherein wavelength multiplexers/demultiplexers combine the upstream (US) and downstream (DS) and sensing channels and a reflective SOA at each ONU enables DOFS on each individual distribution fiber.
Figure 10B:
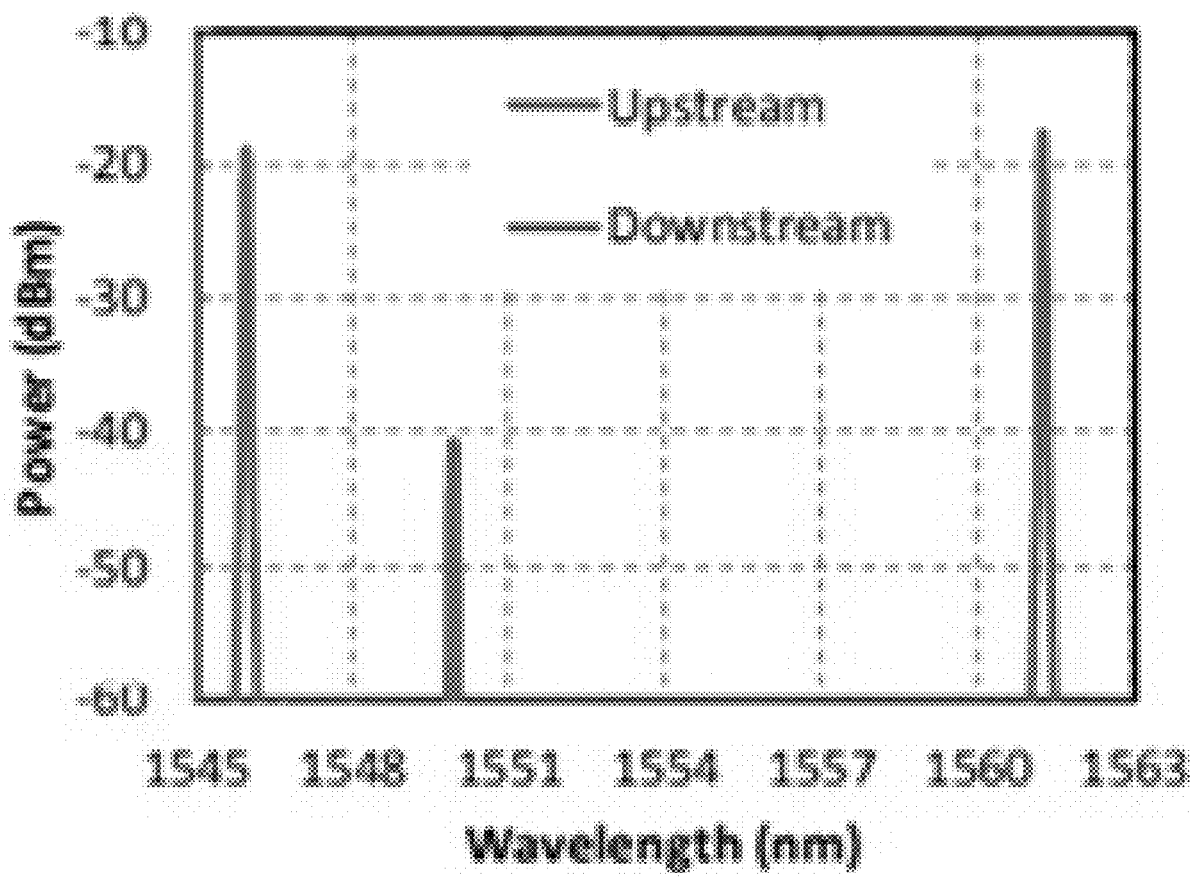
FIG. 10(B) is a plot of Power vs. Wavelength showing US and DS spectra; according to aspects of the present disclosure.

FIG. 10(A) is a schematic of an illustrative experimental setup for DOFS-compatible PON wherein wavelength multiplexers/demultiplexers combine the upstream (US) and downstream (DS) and sensing channels and a reflective SOA at each ONU enables DOFS on each individual distribution fiber; FIG. 10(B) is a plot of Power vs. Wavelength showing US and DS spectra; according to aspects of the present disclosure.

The hybrid transmission/sensing PON architecture shown in FIG. 10(A) illustrates that at the optical line terminal (OLT), the sensing channel (1550 nm), and the 10-Gb/s upstream (1561 nm) and downstream (1546 nm) channels are combined using a wavelength multiplexer. The PON consists of a 4.4-km spool feeder fiber, followed by a 1×32 passive splitter, followed by distribution fibers that are 1.6 km long. The optical network units (ONU) comprise of a wavelength demultiplexer, where the upstream (US) and downstream (DS) ports are connected to PAM4 receivers (Rx) and transmitters (Tx), respectively, and the sensing port is terminated by an RSOA. When the RSOA is turned on at one particular ONU, the forward-propagating sensing pulse is amplified and reflected, becoming a backward propagating sensing pulse which generates its own optical time-domain reflectometry (OTDR) signal. This secondary OTDR signal is initially forward-propagating, where upon impinging the RSOA, it is amplified and reflected back towards the OLT.

Figure 11A:
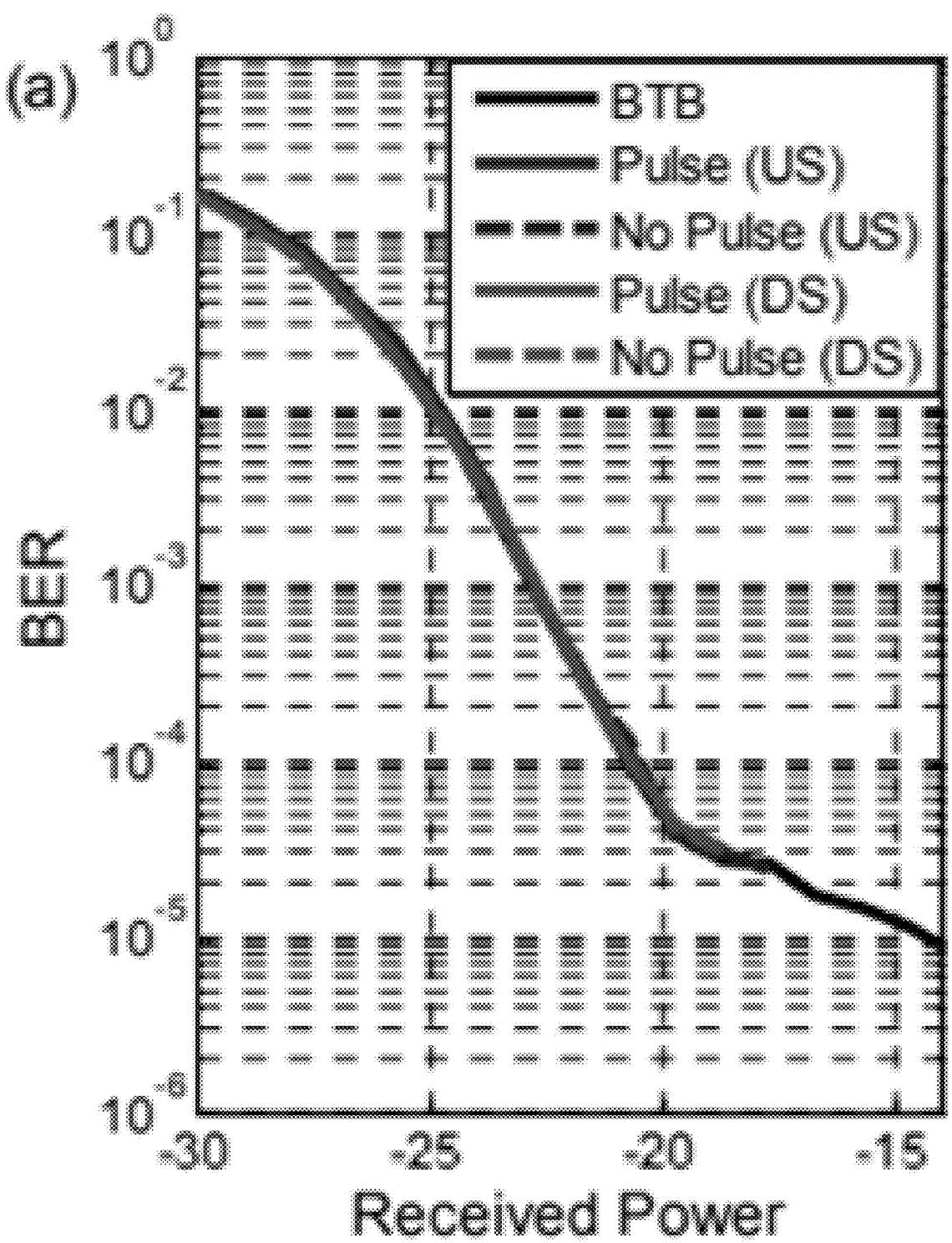
FIG. 11(A) is a plot of BER vs received power for 6-Gbaud PAM-4 signal.
Figure 11B:
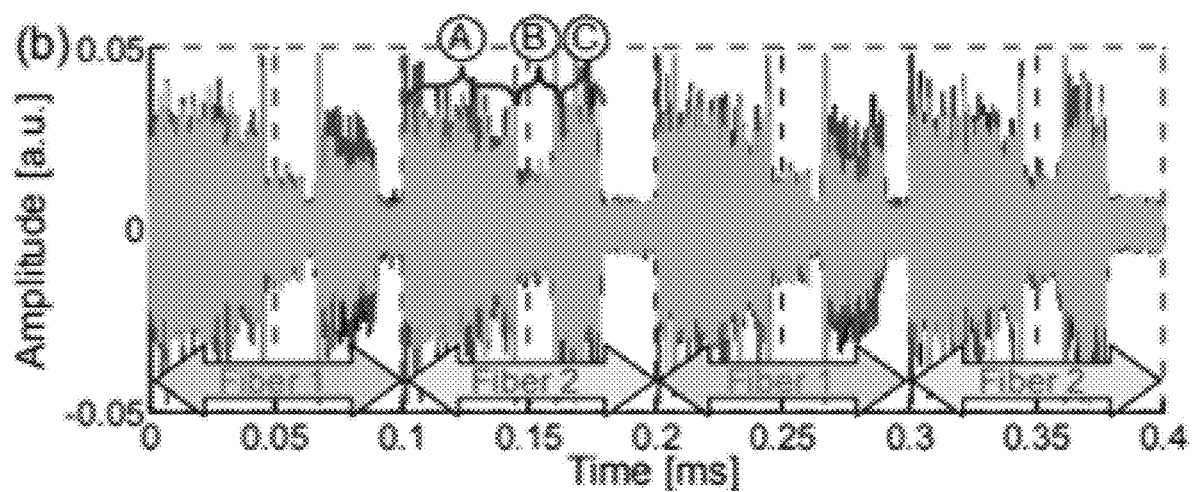
FIG. 11(B) is an OTDR trace captured by a sensing channel when SOAs of distribution fibers #1 and #2 are switched on consecutively.
Figure 11E:
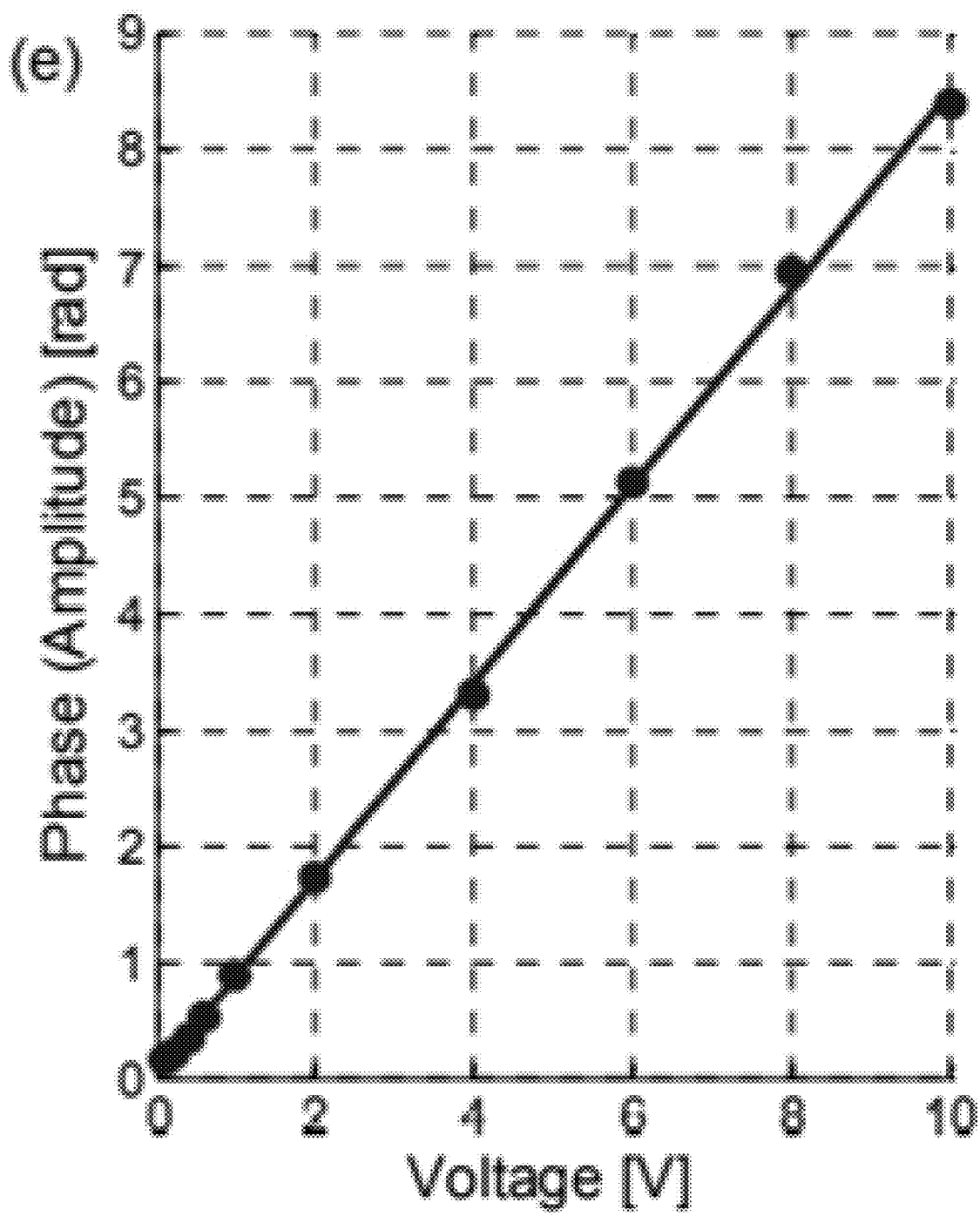
FIG. 11(E) is a plot of measured phase amplitude vs applied piezo voltage; all according to aspects of the present disclosure.

FIG. 11(A) is a plot of BER vs received power for 6-Gbaud PAM-4 signal; FIG. 11(B) is an OTDR trace captured by a sensing channel when SOAs of distribution fibers #1 and #2 are switched on consecutively; FIG. 11(C) is a plot of phase evolution; FIG. 11(D) is a plot of its spectrum measured on fibers #1 and #2; and FIG. 11(E) is a plot of measured phase amplitude vs applied piezo voltage; all according to aspects of the present disclosure.

A sample OTDR trace measured at the OLT is shown in FIG. 11(B). In each "frame corresponding to the RSOA of one ONU being turned on, the initial portion (A) of the trace is Rayleigh backscatter of the feeder fiber. This is followed by the weaker backscatter (due to the 1×32 splitter) of the 1.6-km distribution fiber (B). The amplified secondary backscatter of the distribution fiber created by the backward-propagating sensing pulse follows in (C). Using the architecture shown, we can interrogate each distribution fiber selectively by turning on/off the RSOA in that ONU. According to aspects of the present disclosure, we may employ a master controller at the OLT turn on/off the RSOAs. When a particular distribution fiber is interrogated, the RSOAs at all other ONUs must be turned off so they do not interfere with the OTDR of the desired distribution fiber. Since each of the 31 other distribution fibers contributes a Rayleigh backscatter from the forward-propagating sensing pulse, the sum of these is an interference that overlaps with (B) in FIG. 11(B). To ensure this interference does not extend into the desired portion (C) which is used for DAS, it is necessary to ensure all distribution fibers are the same length.

Experimental results were determined by first conducting transmission of 6-Gbaud PAM4 over the hybrid PON/DAS architecture shown in FIG. 10(A). FIG. 11(A) shows BER vs received power for back-to-back, upstream and downstream transmission with and without the sensing signal present. Due to the low accumulated chromatic dispersion (CD), there is no observable transmission penalty. In addition, the presence of the sensing pulse train had negligible impact on performance, proving the compatibility of data transmission with sensing in our scheme.

In January 2018, the 3rd Generation Partnership Project (3GPP) released the first version of the specification on the Ethernet Common Public Radio Interface (eCPRI) used for 5G fronthaul. The 25G eCPRI has almost certainly been designated as the 5G fronthaul interface. The 25G single-channel interface will be a mainstream interface for 5G fronthaul. To verify the correct operation of the DOPS function, we performed distributed acoustic sensing (DAS) by coherently detecting the OTDR of the Rayleigh backscatter (FIG. 11(B)). Two piezoelectric fiber stretchers are inserted at the input of two distribution fibers as shown.

The drive signals for each fiber stretcher are set to 5 V amplitude, and at frequencies of 100 Hz and 133 Hz, respectively. Sensing pulses of 100 ns duration (spatial resolution ~1 m) are launched into the PON at a repetition rate of 10 kHz. The RSOAs at the end of the two distribution fibers are turned on consecutively every other pulse, resulting in an acoustic sampling rate of 5 kHz for each fiber. The optical phase change generated by the acoustic signal is measured by offline digital signal processing (DSP) of the coherent OTDR. The front-end DSP operations includes resampling, filtering, and DSP emulation of an interferometer with differential length of 2 m. We then normalize the power of the differential beat signal at each distance, followed by bandpass filtering to produce "waterfall plots" showing the evolution of the vibration amplitude in time for different fiber positions. The frame rate of 5 kHz means that acoustic frequencies up to 2.5 kHz can be measured.

FIG. 11(C) shows the acoustic phases measured at the position of the piezo-stretcher for each distribution fiber (amplitude ~4.3 rad). FIG. 11(D) shows the acoustic spectrum at the same position. The noise floor corresponds to a strain level of 0.35 ne/√Hz. We swept the amplitude of the drive signal at one of the distribution fibers and measured the amplitude of the acoustic phase, and the result is shown in FIG. 11(E).

Finally, we used the DOPS to measure real world vibration by connecting a 400 m long buried optical fiber cable between the output of the 1×32 splitter and one of the distribution fibers (FIG. 10(A)). The cable is buried at a depth ~50 cm. We measured the vibration generated by (a) walking and (b) slow cycling next to the buried cable at a distance of ~1 m, as well as (c) driving next to the cable at a distance of ~5 m.

Figure 12A:
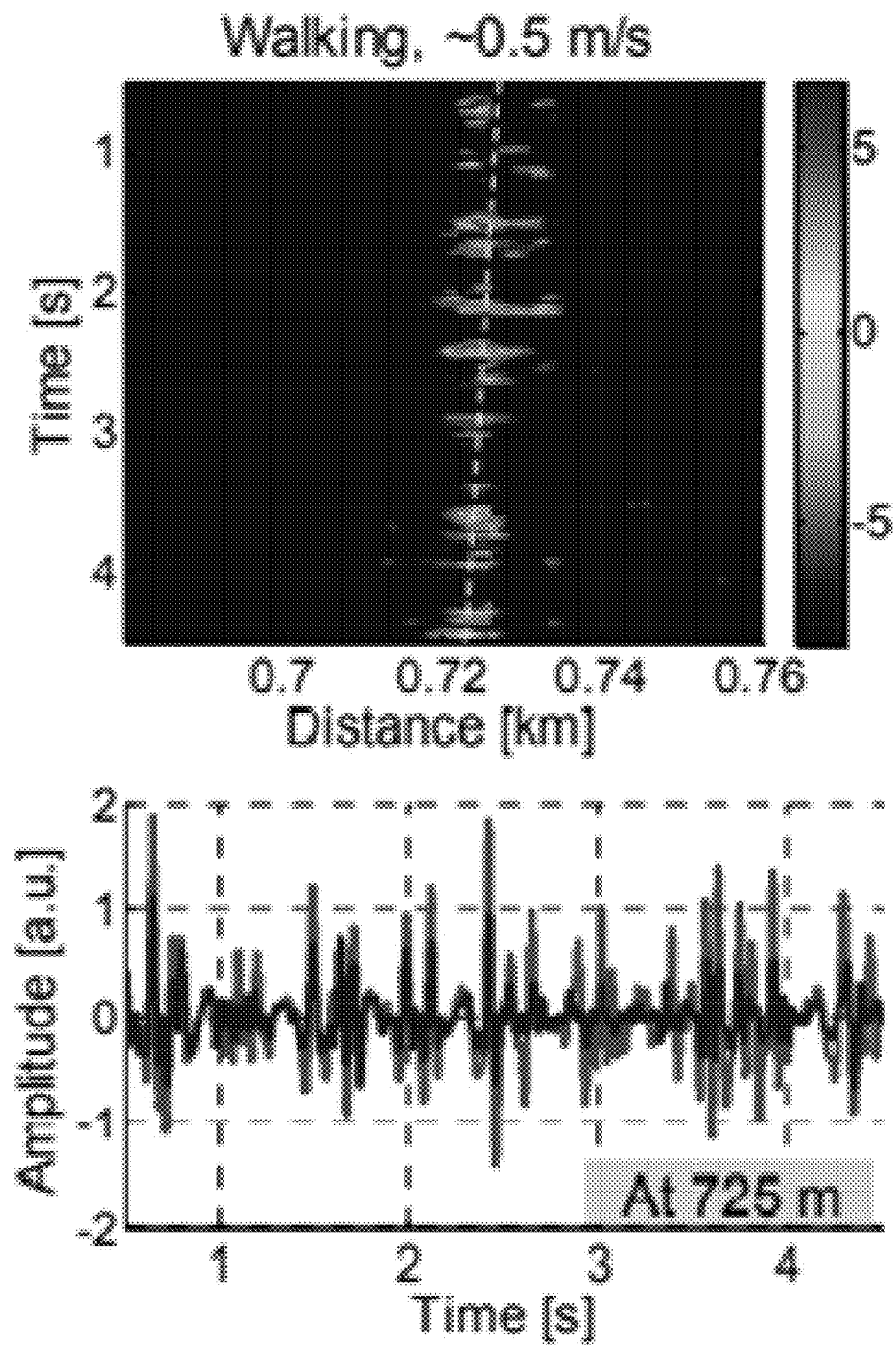
FIG. 12(A), FIG. 12(B), and FIG. 12(C) are waterfall plots recorded for walking, cycling, and driving, respectively, using DAS based on coherent detection of Rayleigh backscatter and corresponding amplitude traces at fiber positions impacted by the vibration wherein the speed of the vibration source may be inferred by the slope; according to aspects of the present disclosure.
Figure 12B:
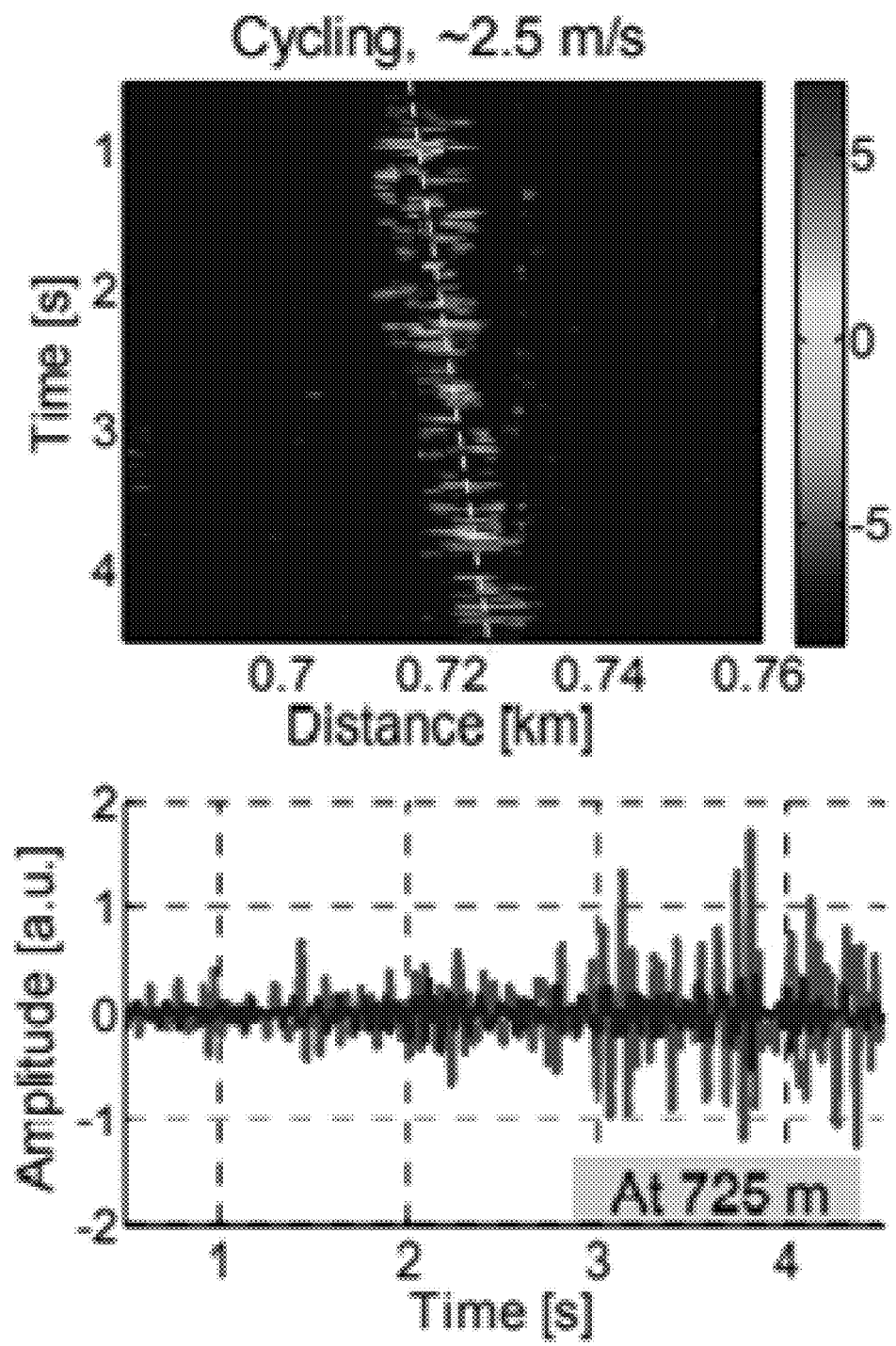
Figure 12C:
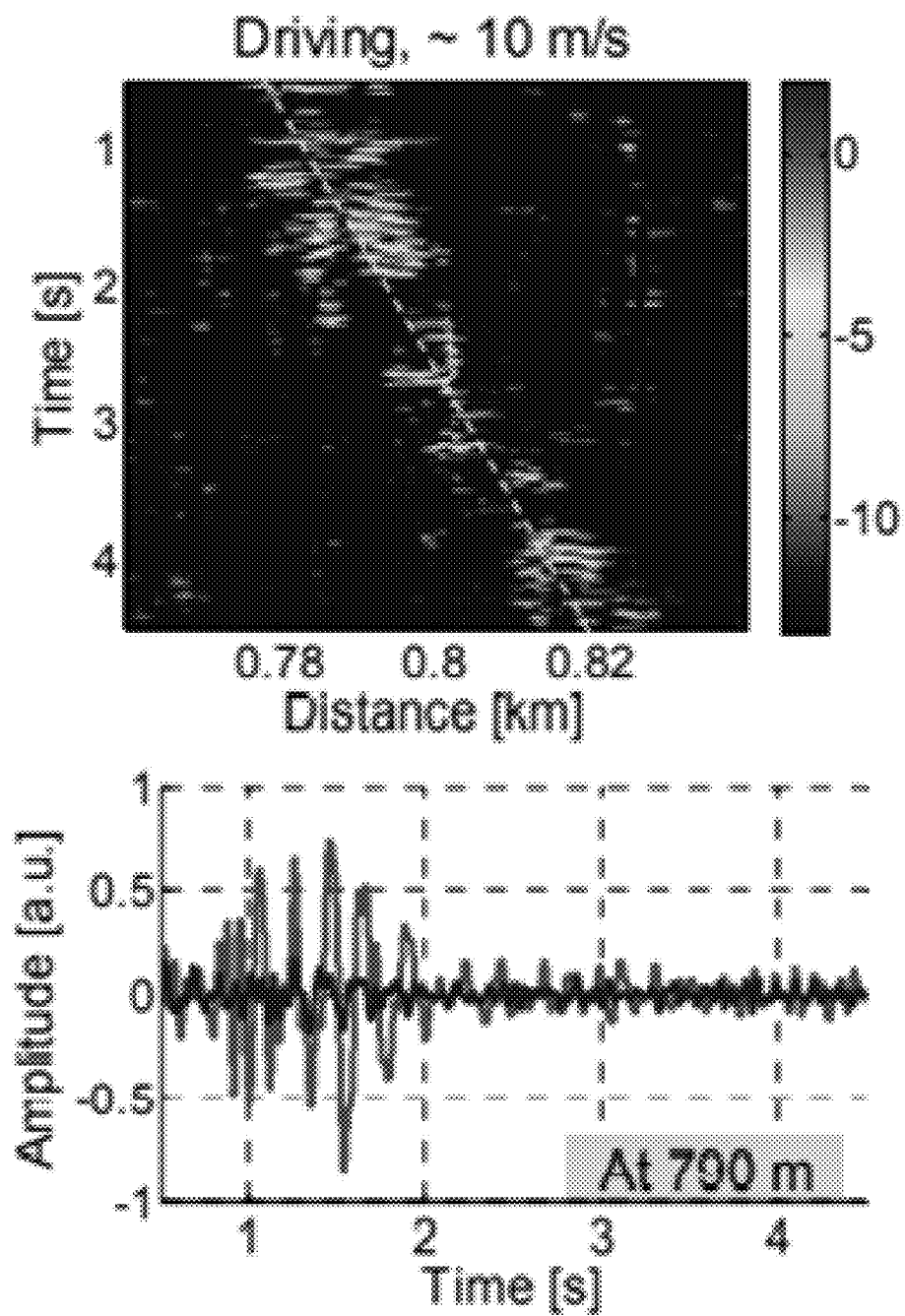

FIG. 12(A), FIG. 12(B), and FIG. 12(C) are waterfall plots recorded for walking, cycling, and driving, respectively, using DAS based on coherent detection of Rayleigh backscatter and corresponding amplitude traces at fiber positions impacted by the vibration wherein the speed of the vibration source may be inferred by the slope; according to aspects of the present disclosure.

As shown in the figure, "waterfall" plots recorded by the DOPS, and the real/imaginary waveforms at the positions shown. The slope of the waterfall plot can be used to infer the speed of the vibration source: steeper/shallower slopes correspond to slower/faster movements, respectively. The estimated speeds of walking, cycling and driving were ~0.5 m/s, 2.5 m/s and 10 m/s, respectively. At this point, we have demonstrated a new PON architecture which allows simultaneous 5G mobile backhaul transmission at 10-Gb/s and distributed optical fiber sensing of each distribution fiber. The enabling technologies are RSOAs placed at each ONU, which can be selectively turned on to generate a backward propagating sensing pulse that can interrogate each distribution fiber. The upstream and downstream data channels, and the sensing channels coexist on three separate wavelengths. We successfully demonstrated distributed acoustic sensing (DAS) based on coherent OTDR using this architecture.

At this point, while we have presented this disclosure using some specific examples, those skilled in the art will recognize that our teachings are not so limited. Accordingly, this disclosure should be only limited by the scope of the claims attached hereto.

The invention claimed is:

1. A method of operating an optical fiber sensing system exhibiting reduced spatial resolution and noise, the method comprising:
    providing the optical fiber sensing system including:
        a length of optical fiber;
        an optical interrogator unit configured to generate optical pulses, introduce the generated optical pulses into the optical fiber and receive Rayleigh reflected signals from the fiber; and
        a coherent receiver unit configured to extract sensory information from the received Rayleigh reflected signals;
    operating the optical fiber sensing system such that the Rayleigh reflected signals are received from the optical fiber;
    generating, from the received Rayleigh reflected signals, a set of four mixed signals ($x_i(t)$, $x_q(t)$, $y_i(t)$, and $y_q(t)$) for subsequent detection;
    individually digitizing the four mixed signals and then combining the four digitized into two complex-valued signals; and
    determining fiber strain using beat products between the complex-valued signals at two locations along the length of the optical fiber;
    wherein the Rayleigh signals are received in two orthogonal polarizations and four beating products $\zeta_{xx}$, $\zeta_{yy}$, $\zeta_{xy}$, $\zeta_{yx}$ are determined simultaneously in a Digital Signal Processor (DSP) and all four are used for fiber strain determination.

2. The method of claim 1 further comprising converting beat signals from a serial sequence of locations along the optical fiber to parallel location sequences such that beat product vectors $\zeta_{p,ij}$ are obtained and these vectors are processed separately at each location of the fiber to determine dynamic fiber strain at such location.

3. The method of claim 2 further comprising performing a multi-polarization-state combining (MPSC) wherein beat products $\zeta_{p,ij}$ are combined into a single result $\zeta_p$.

4. The method of claim 3 wherein the MPSC comprises averaging the beat vectors, using a low pass filter, to determine an average of each for vectors, multiplying a complex conjugate of the averaged vector with a corresponding vector using inner product and summing the four products such that the one single resulting vector $\zeta_p$ represents the fiber strain at a location p.

\* \* \* \* \*